United States Patent [19]
Maples

[11] 3,982,697
[45] Sept. 28, 1976

[54] SPRAYING APPARATUS

[76] Inventor: H. Eugene Maples, 280 Pee Dee Road, Southern Pines, N.C. 28387

[22] Filed: June 18, 1975

[21] Appl. No.: 588,048

[52] U.S. Cl. .......................... 239/289; 239/DIG. 6; 239/DIG. 1; 239/175; 56/16.8
[51] Int. Cl.² .................. A01D 43/00; B05B 15/04; B05B 17/00
[58] Field of Search ............... 239/DIG. 6, 172, 175, 239/178, 188, 189, 195, 197–199, DIG. 1, 146, 148, 159, 169, 274, 289, 212; 56/16.8, DIG. 5

[56] References Cited
UNITED STATES PATENTS

| | | |
|---|---|---|
| 520,815 | 6/1894 | Van Horn ...................... 239/199 X |
| 1,328,738 | 1/1920 | Hopkins ............................ 239/172 |
| 1,616,769 | 2/1927 | Todd et al. ........................ 239/177 |
| 1,727,294 | 9/1929 | Lennon ........................... 239/175 X |
| 3,021,983 | 2/1962 | Blocksom ...................... 239/DIG. 6 |
| 3,111,268 | 11/1963 | Butler ............................ 239/172 X |
| 3,143,839 | 8/1964 | Johnson .......................... 56/16.8 X |
| 3,534,533 | 10/1970 | Luoma .............................. 56/16.8 |
| 3,628,728 | 12/1971 | Polutnik et al. .................... 239/159 |
| 3,682,054 | 8/1972 | MacPhail et al. ............... 239/289 X |
| 3,753,409 | 8/1973 | Frazier ........................... 239/198 X |

FOREIGN PATENTS OR APPLICATIONS

| | | |
|---|---|---|
| 1,168,692 | 4/1964 | Germany ......................... 239/199 |
| 1,228,100 | 11/1966 | Germany ......................... 239/199 |

*Primary Examiner*—Robert S. Ward, Jr.

[57] ABSTRACT

An improved spraying apparatus for use in combination with a mowing apparatus is described which facilitates uniform application of a liquid spray to grassy surfaces while minimizing surface compaction, said apparatus being comprised of means for receiving liquid from a remote supply source and means for discharging a liquid spray onto the surface being treated, the spray pattern contacting said surface having a width substantially equal to the width of the swath cut by the mowing apparatus.

7 Claims, 3 Drawing Figures

SPRAYING APPARATUS

BACKGROUND OF THE INVENTION

Treatment of grassy surfaces, e.g., golf course putting greens, with liquid materials such as liquid fertilizers, pesticides, and the like, is presently effected by various methods. In one method, a hand-held spray nozzle connected to a remote tank by a supply hose is carried onto the surface and moved about by the operator to effect coverage. This method, while requiring a minimum of equipment, is laborious and results in non-uniform coverage since it is difficult for the operator to determine which areas have been treated resulting in some areas not being treated at all, with other areas receiving more than one application. Consequently, a non-uniform growth or other result is obtained which is not only unpleasing in appearance but, in the case of putting greens and the like, causes a non-uniform playing surface.

In another method, a wheeled, multi-nozzle sprayer connected to a remote tank by a supply hose is pushed over the surface by the operator. While this method permits a somewhat more accurate application of liquid to the surface, it is highly laborious, often requiring a second operator to pull the hose. Furthermore, non-uniform coverage still results since the degree of application is related to the walking speed of the operator.

A third approach has been to employ a vehicular sprayer having a supply tank communicating with multiple spray nozzles to direct liquid onto the surface. While utilization of a sprayer of this nature is fast and permits generally uniform coverage, it is difficult to operate within the confines of a putting green, tends to compact the surface due to the weight of the liquid causing ruts and inhibiting the growth of grass, and requires frequent refilling because of the inherent limits on supply tank capacity.

SUMMARY OF THE INVENTION

The present invention relates to a sprayer apparatus adapted for use in combination with a mower permitting uniform application of liquids to grassy surfaces while minimizing surface compaction, improving accuracy and uniformity of coverage, eliminating laborious hand manipulation of hose, and saving a substantial amount of labor due to the combined mowing and spraying operations.

The apparatus is comprised of a frame adapted for attachment to a conventional triplex greens mower; a liquid intake means for receiving liquid through a supply hose from a remote source, e.g., a wheeled supply tank; and a liquid discharge means associated with the intake means for discharging a liquid spray onto the surface being treated.

Preferably, the sprayer frame is formed of two sections, a first section being affixed to the mowing apparatus and a second section being releasibly mounted on the first section. In this manner, a substantial part of the sprayer apparatus may be readily detached from the mowing machine when not in use.

In order to eliminate the possibility of entanglement of the intake hose with the mowing machine or contact with the spray, the hose is preferably held away from the sprayer apparatus by way of a horizontally positioned boom which is pivotally mounted to swing approximately over the rearmost 180° of the mowing machine.

The liquid discharge means of the present apparatus is preferably comprised of a rearwardly projecting spray nozzle fixedly mounted on the mowing machine, it being understood that a plurality of nozzles positioned to form a common spray pattern may also be employed. The spray nozzle is designed and positioned on the mowing machine to spray an area immediately behind the mowing machine which is substantially equal in width to the swath cut by the mowing machine. Thus, when the operator mows the grassy surface, being guided by the edge of the unmowed area, a uniform spray will also be applied which is coextensive with the width of the mowed area.

Thus, it is the primary object of the present invention to provide an improved sprayer apparatus for use in combination with a mower, or the like.

It is a particular object to provide an improved spray for putting greens and the like, permitting application of liquids with improved accuracy and uniformity of coverage, minimization of surface compaction, and reduced labor requirements.

Other objects of the present invention, if not specifically set forth herein, will be apparent to the skilled artisan upon reading the detailed description of the preferred embodiment taken in conjunction with the drawings in which.

DESCRIPTION OF THE PREFERRED EMBODIMENT

Figure 1:
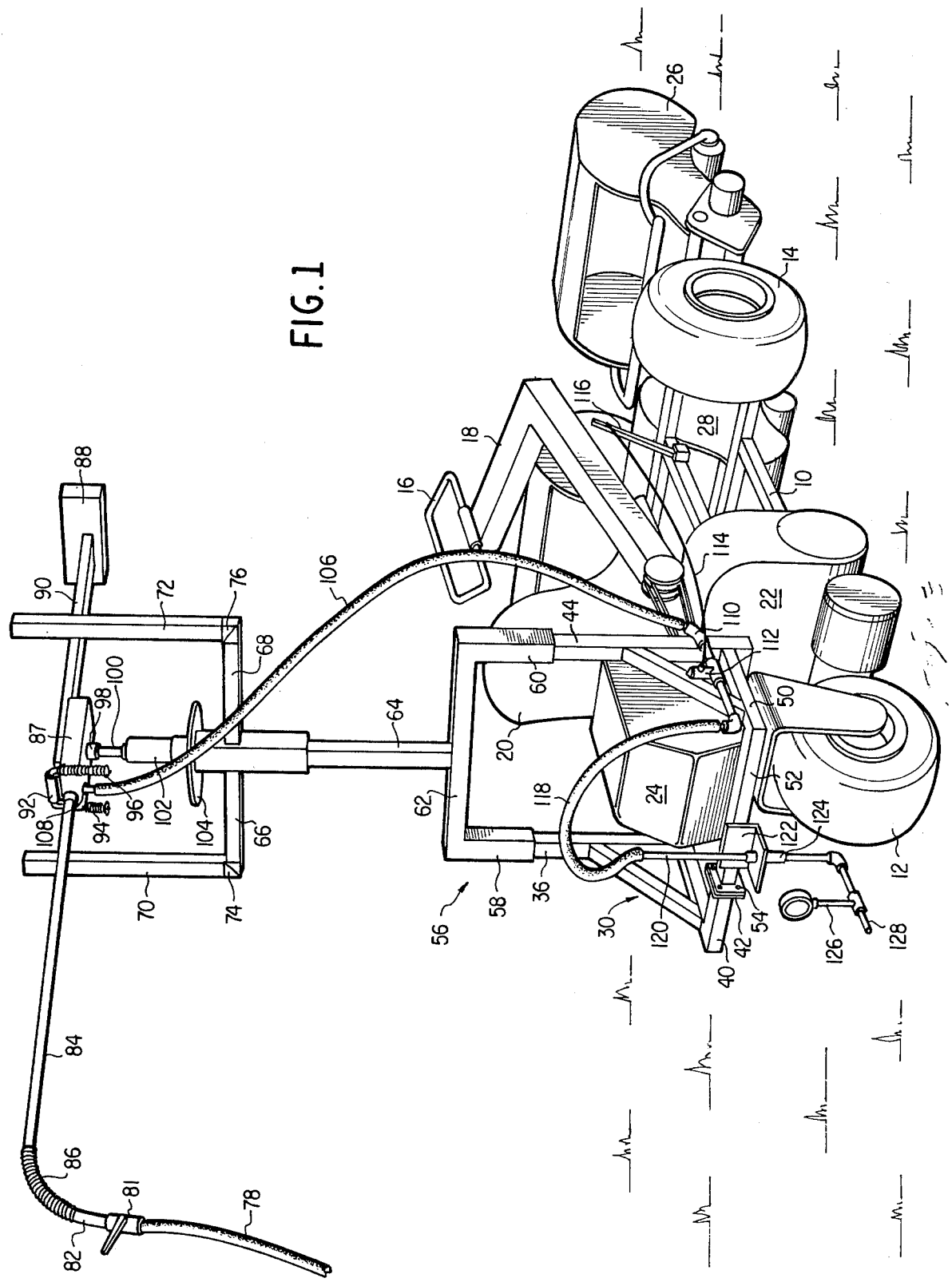
FIG. 1 is a schematic view of the preferred embodiment showing the sprayer attached to a typical triplex greens mower.

In the illustrated embodiment, the sprayer apparatus is shown mounted upon a typical triplex greens mower. It is to be understood, however, that the sprayer apparatus may also be used in combination with other mowers or other suitable vehicles, and that the mower does not per se form part of the present invention.

As shown in the drawing, the mowing machine is comprised of a chassis 10 supported at the rear by steerable wheel 12 and at the front by drive wheel 14 and an opposed wheel, not shown. Steering of wheel 12 is effected with steering wheel 16 carried on steering arm 18, which is supported by chassis 10. A seat 20 is provided for the operator. Power is provided by engine 22, fed from gasoline tank 24. Cutting is effected by way of three mowing units positioned to cut a common swath having a given width, specifically, unit 26, unit 28, and a third unit, not shown.

Figure 2:
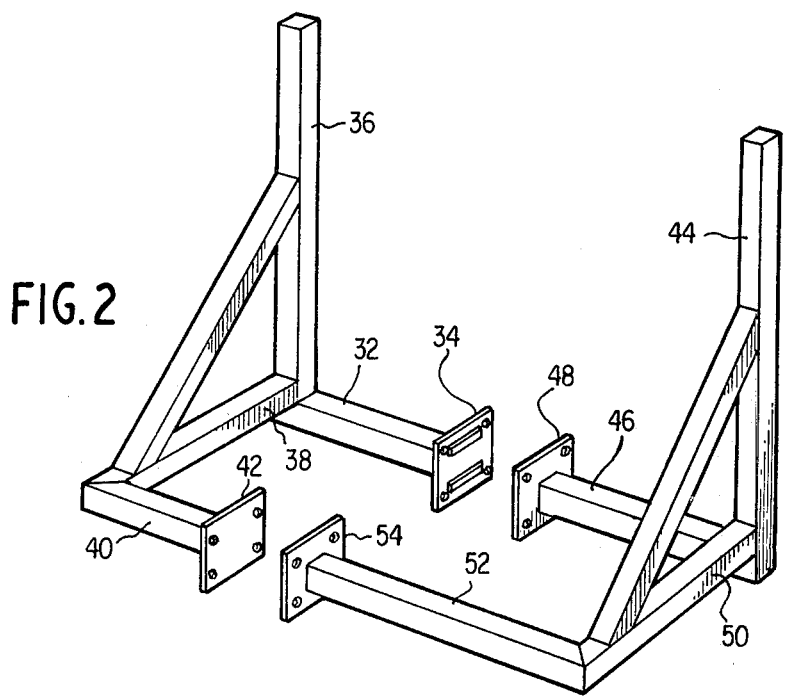
FIG. 2 is a partial view of the sprayer frame showing means for attachment of the sprayer to the mower chassis.

The sprayer apparatus of the present invention includes a lower frame section, generally 30, mounted on chassis 10. As illustrated in detail in FIG. 2, frame 30 is comprised of a pair of sub-assemblies adapted to be mounted upon chassis 10 of the mowing machine. The first of these sub-assemblies is comprised of a horizontal chassis mounting bar 32 having a chassis mounting bracket 34 integral with its inner end, and an upright mounting bar 36 integral with its outer end. A sprayer mounting bar comprised of a rearwardly extending section 38 and an inwardly directed section 40 integral with the outward end of section 30 extends from bar 36. An assembly flange 42 is positioned at the end of section 40.

The second sub-assembly of frame section 30 is correspondingly comprised of an upright mounting bar 44, an inwardly extending horizontal chassis mounting bar 46 having a mounting bracket 34 to secure frame section 30 to chassis 10. A second sprayer mounting section comprised of a rearwardly extending horizontal bar 50 and an inwardly extending bar 52 having an assembly flange 54 at its inner end engageable with assembly flange 42 extends rearwardly from mounting bar 44 to complete, upon assembly, means for mounting a sprayer unit to be described hereinafter.

An upper frame section, generally 56, is supported by lower frame section 30. Section 56 is comprised of a pair of downwardly extending, parallel mounting sleeves 58 and 60 spaced for engagement over bars 36 and 44 of section 30. The upper ends of sleeves 58 and 60 are integral with opposed ends of horizontal support bar 62. A vertical support column 64 extends upwardly from the center of support bar 62, and is integral therewith at its lower end. Extending outwardly from column 64 in a plane with bar 62 are a pair of opposed support bars 66 and 68, supporting at their outer ends a pair of upright limit arms 70 and 72, respectively, which serve to limit the movement of travel of a boom, to be described hereinafter, to approximately the rearmost 180° of the mowing machine. Arms 70 and 72 are secured to bars 66 and 68 with hinged brackets 74 and 76 respectively, permitting lowering of arms 70 and 72 to permit movement to the boom in a forward direction, for example, during transportation or storage of the apparatus.

Liquid is supplied to the sprayer apparatus from a remote supply source such as a wheeled tank, T, located off of the surface being treated and pulled by a tractor or other vehicle, V, and is directed to the apparatus through reelable supply hose 78. Hose 78 communicates through a combination quick-coupling and shut-off valve 81 to a second hose 82 which, in turn, communicates with a horizontal boom 84 extending rearwardly from between arms 70 and 72. Kinking of hose 78 is prevented by spring 86 about hose 78. The end of boom 84 opposite hose 78 is secured between arms 70 and 72 in mounting bracket 86. The weight of boom 84 is balanced by counterweight 88 positioned at the end of support arm 90, which is secured to bracket 86 with mounting member 92 carrying compression springs 94 and 96.

Mounting bracket 86 is attached by fitting 98 to upright vertical spindle 100 which extends downwardly into bearing housing 102 and is rotatably mounted therein. Housing 102 is fixedly attached to the upper end of vertical column 64 of frame section 56 with mounting adapter 104.

Liquid is permitted to travel from boom 84 to the discharge portion of the sprayer apparatus, to be described hereinafter, by way of hose 106 attached to boom 84 by fitting 108. Hose 106 communicates through a release valve 110 to shut-off valve 112 operable between open and closed positions by way of cable 114 by operating lever 116. Alternative operating means may be employed. For example, valve 112 may be conveniently controlled by a foot pedal.

Discharge of liquid downstream from shut-off valve 112 is effected through flexible hose 118 extending from valve 112 to vertical pipe 120 held in a vertical position by mounting bracket 122 on horizontal bar 52. Pipe 120 is vertically adjustable by way of adjustment sleeve 124 integrally formed with mounting bracket 122. The lower end of pipe 120 communicates through regulator gauge 126 to horizontally positioned, rearwardly extending spray nozzle 128 which is adapted to discharge a spray of liquid to the rear of the mowing machine. The configuration of nozzle 128 and its position are designed to form a pattern of spray which, upon impingement on the surface being treated, has a width substantially equal to the width of the swath being cut by the mowing machine.

Figure 3:
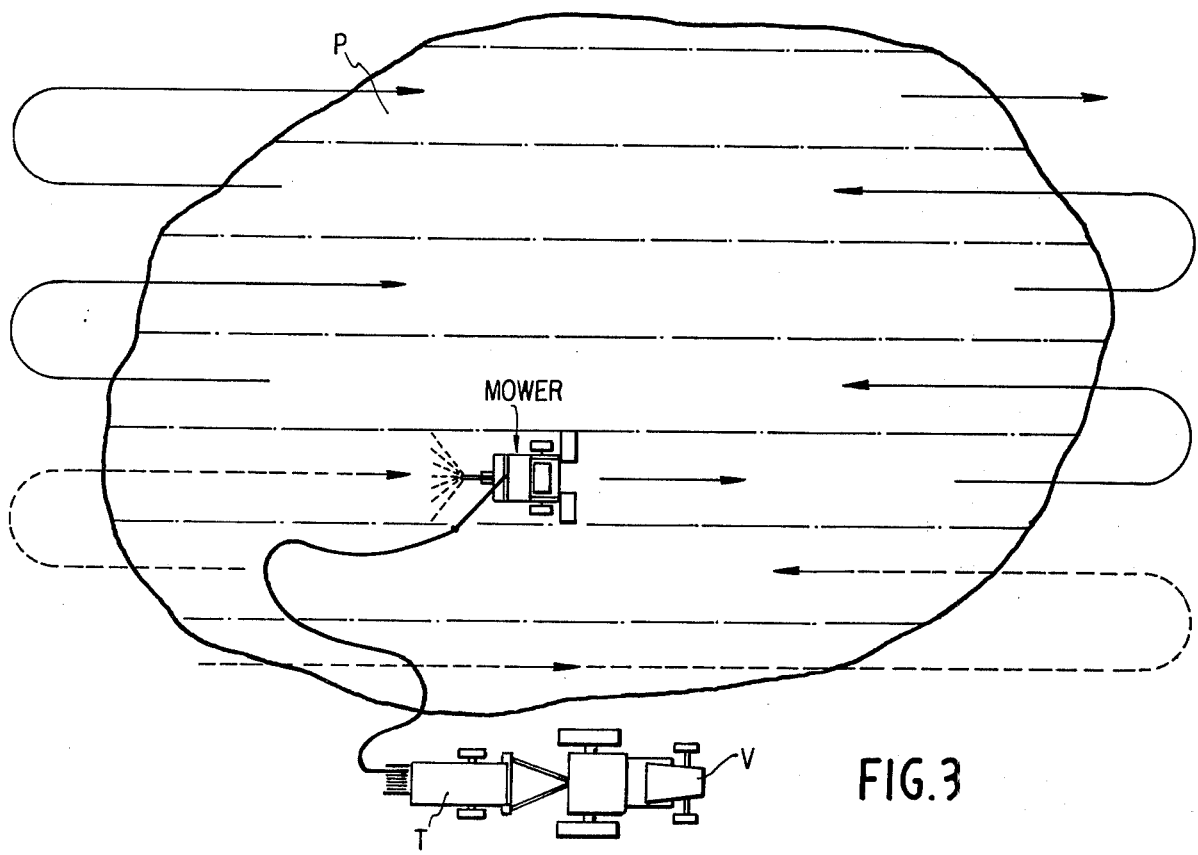
FIG. 3 is a plan view of a putting green illustrating the pattern of movement of the sprayer-mower over the green during operation.

As illustrated in FIG. 3, the combined mowing and spraying of the putting green is effected by driving the mowing machine from one side of a putting green, P, along a plurality of alternate paths of movement arranged parallel relative to each other, with each alternate path of movement being located adjacent to a preceding path of movement, whereby the plurality of paths of movement are collectively operable to completely and uniformly treat the putting green surface. It is known to treat surfaces in a pattern of this nature as illustrated, for example, by U.S. Pat. No. 3,753,409 to Frazier, and putting greens are commonly mowed in this manner.

In operation, the operator drives the mowing machine across the putting green or other grassy surface in a manner shown in FIG. 3, cutting a swath. Liquid under pressure from tank T is directed through hoses 78 and 82 and the interior of boom 84. From boom 84, the liquid moves downwardly through flexible hose 106 to shut-off valve 112. When valve 112 is in an open position, the liquid moves through valve 112 into flexible hose 118, and downwardly through pipe 120 to be discharged through spray nozzle 128. Since spray nozzle 128 is of a configuration and position such that the pattern of spray upon contact with the surface has a width substantially equal to the width of the swath being cut, a uniform application of liquid is achieved as the operator mows the grassy surface.

It will be obvious to one skilled in the art that many modifications and variations may be made in the preferred embodiment described above without departing from the spirit and scope of the present invention.

I claim:

1. A liquid spraying apparatus for use in combination with a self propelled mower having a cutting swath of a given width comprising:
    a. a frame adapted to be attached to said mower, said frame including a vertically extending section which extends above the top of said mower when said frame is attached to said mower;
    b. a remote liquid supply source;
    c. a liquid intake mounted on said vertically extending section at a position above the top of said mower for receiving liquid from said remote liquid supply source, said liquid intake including,
        i. an intake conduit extending toward the rear of said mower, said conduit having an intake end adapted for communication with said remote liquid supply source and a discharge end communicating with a liquid discharge,
        ii. a pivotal connector supporting said intake conduit permitting free rotation of said intake conduit during mowing by said mower, and
        iii. means for preventing said intake conduit from pivoting on said connector to an orientation wherein said intake conduit is disposed in front of said mower above the path of said cutting swath; and c. a liquid discharge mounted on said frame in communication with said liquid intake, said liquid discharge having a pattern of spray on a surface being mowed by said mower which is substantially equal to the width of said cutting swath.

2. The apparatus as recited in claim 1 wherein:

a. said means for preventing said intake conduit from pivoting limits the rotation of said intake conduit to approximately 180°.

3. The apparatus as recited in claim 1 wherein:

a. said liquid discharge comprises a rearwardly directed spray nozzle mounted on said frame, said spray nozzle including means permitting vertical adjustment of the position of said spray nozzle.

4. The apparatus as recited in claim 2 wherein said vertically extending section comprises:

a. a vertically extending frame member attached to said frame;

b. a horizontally disposed frame member attached to the top of said vertically extending frame member, said horizontally disposed frame member having a first and second end;

c. a pair of vertical members attached respectively to first and second ends of said horizontally disposed frame member, said vertical members preventing rotation of said intake conduit through more than approximately 180°.

5. The apparatus as recited in claim 4 further comprising:

a. a first hinge attached to said first end of said horizontally disposed frame member and one of said vertical members;

b. a second hinge attached to the second end of said horizontally disposed frame member and to the remaining one of said vertical members.

6. The apparatus of claim 4 wherein said frame further comprises:

a. a section adapted to be attached to the rear of said mower; and b. wherein said vertically extending frame member is releaseably secured to said section adapted to be attached to the rear of said mower.

7. The apparatus of claim 1 wherein:

a. said liquid discharge communicates with said liquid intake through a conduit; and b. the flow of liquid through said conduit is controlled by a valve having open and closed positions.

* * * * *